United States Patent [19]

Boltz

[11] 4,185,518
[45] Jan. 29, 1980

[54] ACTUATING LEVER ASSEMBLY

[75] Inventor: Hartmann Boltz, Mainz, Fed. Rep. of Germany

[73] Assignee: General Motors Corporation, Detroit, Mich.

[21] Appl. No.: 885,318

[22] Filed: Mar. 10, 1978

[51] Int. Cl.² ............................................. G05G 1/04
[52] U.S. Cl. ..................................................... 74/516
[58] Field of Search ................. 74/519, 520, 521, 522, 74/522.5, 523, 516

[56] References Cited

U.S. PATENT DOCUMENTS

| | | | |
|---|---|---|---|
| 275,256 | 4/1883 | Noonan | 74/523 X |
| 366,774 | 7/1887 | Isbell | 74/520 |
| 737,541 | 8/1903 | Williams | 74/522 |
| 802,649 | 10/1905 | Laflin | 74/522 |
| 1,241,440 | 9/1917 | Pilcher | 74/519 |
| 1,834,081 | 12/1931 | Wrigley | 74/522 |
| 2,506,151 | 5/1950 | Hoven et al. | 74/522 X |
| 2,757,908 | 8/1956 | Broadwin | 74/23 X |
| 3,575,064 | 4/1971 | Stevinson | 74/520 |
| 4,002,050 | 1/1977 | Clavin | 74/520 X |

Primary Examiner—Samuel Scott
Assistant Examiner—Wesley S. Ratliff, Jr.
Attorney, Agent, or Firm—R. L. Phillips

[57] ABSTRACT

The invention comprises an actuating lever assembly for the actuation of an adjustable member in a mechanical assembly, in particular, an adjustable member in a heating and ventilating assembly in a motor vehicle the lever assembly comprising: a support frame including a support surface and a guide means arranged substantially parallel to, and spaced apart from, said support surface; a movable actuating lever supported in said frame, one end of said actuating lever having a curved shape engageable with said support surface in such a manner that said actuating lever is both supported by, and can roll relative to, said support surface, between predetermined limits, on the application of force to the other end of said lever; guide means on said lever adjacent the center of curvature of said curved end and slidably engageable with said guide means on said support frame; and a connection point on said lever for the attachment thereto of a mechanical linkage between said adjustable member and said lever, which connection point is situated on said lever between said lever guide means and said curved end of the lever so that the ratio of the force applied to the other, free, end of the lever to the force applied at the connection point is at least 1:1.5 and varies continually as the lever is moved between said predetermined limits. The invention primarily produces a means of varying the force transmitted by the lever assembly during actuation of the lever. An important subsidiary feature of the invention is that it is possible to arrange that the free end of the actuating lever moves along a substantially rectilinear path as the lever moves from one of said predetermined limits in the assembly to the other of said predetermined limits in the assembly.

6 Claims, 4 Drawing Figures

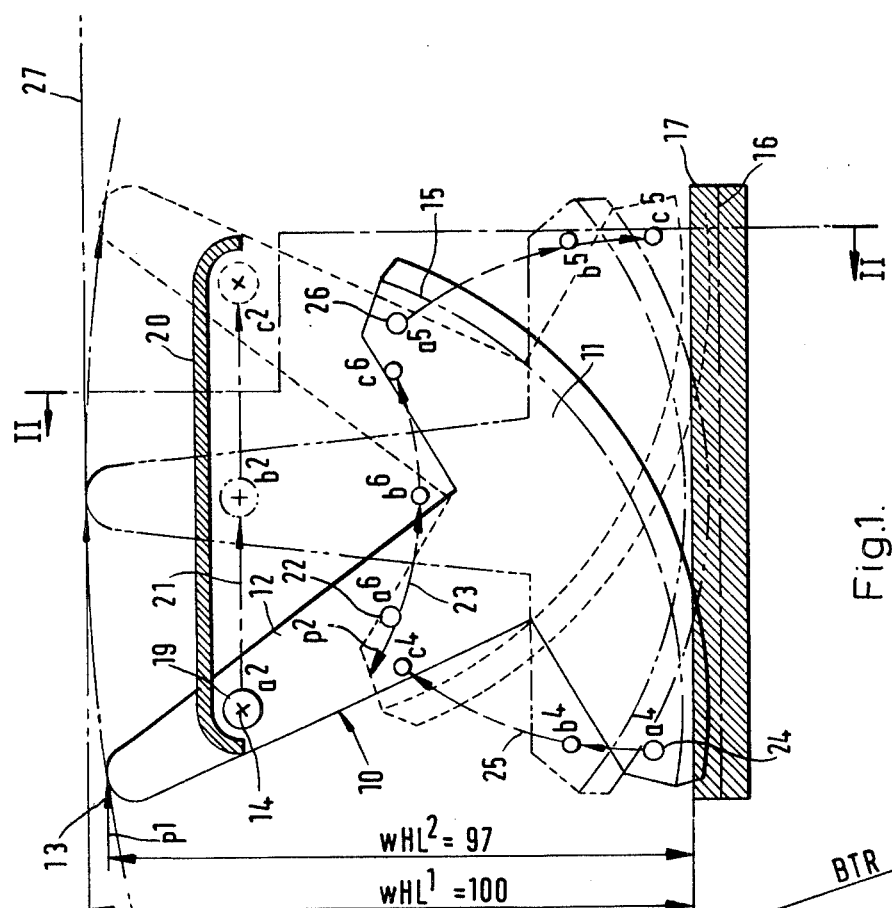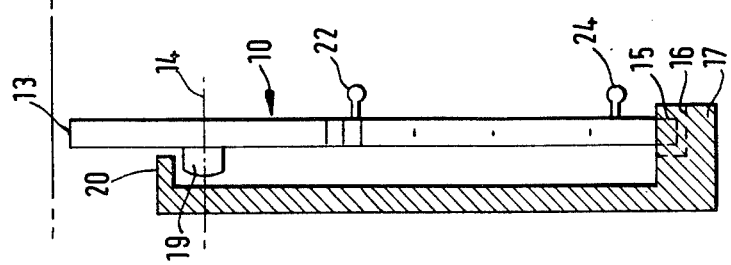

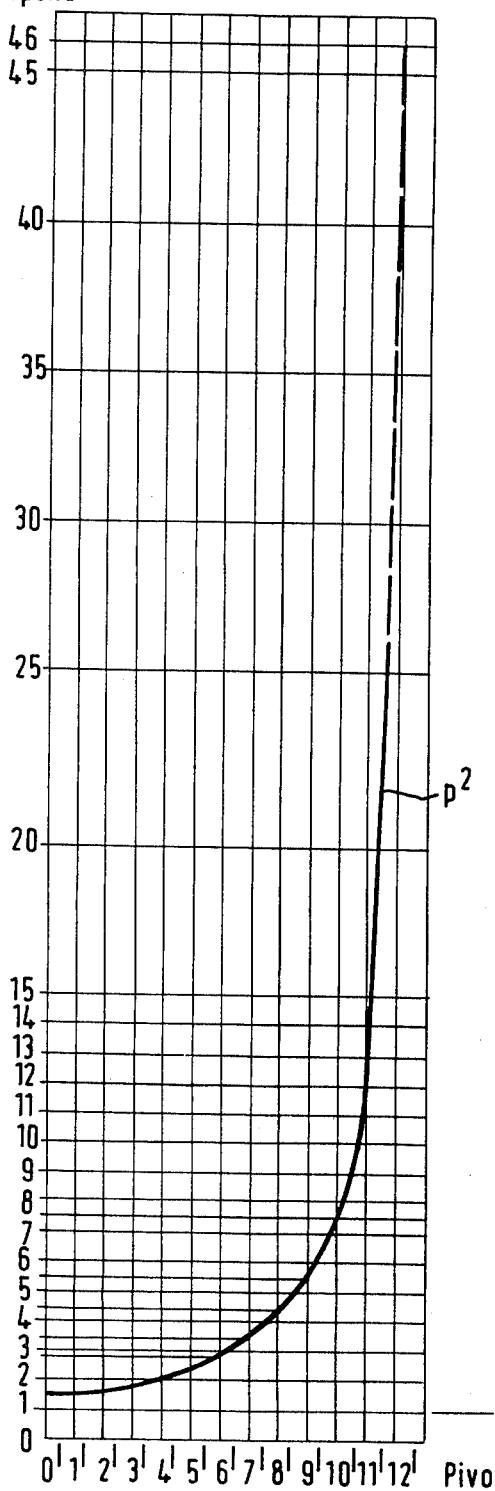

ACTUATING LEVER ASSEMBLY

The invention relates to a lever assembly for actuating an adjustable member in a mechanical assembly. In particular, it relates to a lever assembly for manually operating the heating system of motor vehicles, which assembly includes an actuating lever which is formed with a curved segment at one end which is in rolling engagement with a stationary support surface, whilst the driving force to be delivered for actuating the adjustable member is applied to the other, free end of said actuating lever.

In motor vehicles it is already known to regulate the volume of air, the direction of air and the air temperature of a heating system mechanically by a lever arrangement on the instrument panel.

Since the instrument panel is usually of flat, or substantially flat shape, it is desirable to arrange that the end of the actuating lever protruding out of the instrument panel into the passenger compartment, runs as far as possible in the same plane as the instrument panel, over the entire operating path of the lever. In other words, the length of the actuating lever that projects from the instrument panel should, as far as possible, remain the same throughout the entire operating path of movement of the lever.

It is already known to attain this effect by compulsorily directing the actuating lever by means of a guide slot running parallel with the instrument panel and to ensure that the necessary length compensation of the lever during its rocking movement is made possible by a slot hole in the actuating lever. A possible disadvantage of this construction is that the lever has no fixed point of articulation; indeed the point of articulation shifts in the longitudinal direction of the lever during the movement of the lever.

Also known are lever arrangements in which the above-described goal is to be attained by using an actuating slider and a deflecting rod through which the force applied to the slider is transmitted to the actual lever. Such a construction incorporates a number of individual parts and is therefore somewhat time-consuming and expensive to manufacture.

An actuating lever assembly according to the invention, for the actuation of an adjustable member in a mechanical assembly, comprises: a support frame including a support surface and a guide means arranged substantially parallel to, and spaced apart from, said support surface; a movable actuating lever supported in said frame, one end of said actuating lever having a curved shape engageable with said support surface in such a manner that said actuating lever is both supported by, and can roll relative to, said support surface, between predetermined limits, on the application of a force to the other end of said lever; guide means on said lever adjacent the centre of curvature of said curved end and slidably engageable with said guide means on said support frame; and a connection point on said lever for the attachment thereto of a mechanical linkage between said adjustable member and said lever, which connection point is situated on said lever between said lever guide means and said curved end of the lever so that the ratio of the force applied to the other end of the lever to the force applied at the connection point is at least 1:2 and varies continually as the lever is moved between said predetermined limits.

According to a preferred embodiment of the invention, the actuator lever is an anchor-shaped member and the mechanical linkage engages at a terminal portion of the actuating lever as near as possible to the curved end surface on the actuating lever. The result is that the initially relatively high force-transmission ratio of say 1:2 can be reduced to a fraction of this value (say to 1:40) during the course of the lever movement.

It is preferable to have the free end of the actuating lever extended beyond the centre of curvature of the curved end thereof, to attain the most extended travel possible for the lever during its actuation. When applied to a heating system for a motor vehicle, it is desirable that the length of the end of the actuating lever protruding through the instrument panel into the interior of the passenger space should remain as constant as possible throughout the movement of the lever. In a preferred embodiment of the invention the respective curves of the curved end surface of the actuating lever and of the support surface are adjusted in such a way that the elongated free end of the actuating lever describes a substantially rectilinear path, during operation of the lever. Such an adjustment of the two surfaces rolling upon each other is obtained, for example, by arranging that the curved end surface forms a segment of a circle and the support surface is curved in the same sense, but has a substantially greater radius of the curvature than the segment. Of course, as an alternative, it is also possible to make the support surface flat and to give the curved end surface of the actuating lever a curvature having a convexity which is flatter than that of the segment of a circle.

With reference to embodiments of the invention by way of example, the invention is hereinafter particularly described and illustrated in the accompanying drawings, in which:

FIG. 1 is a plan view, partially in section, of an embodiment of a lever arrangement according to the invention;

FIG. 2 is a cross-sectioned view of the lever arrangement of FIG. 1 taken along the line II—II in FIG. 1;

FIG. 4 is a graphical presentation of the force and lever relationships apparent from FIG. 3.

Figure 3:
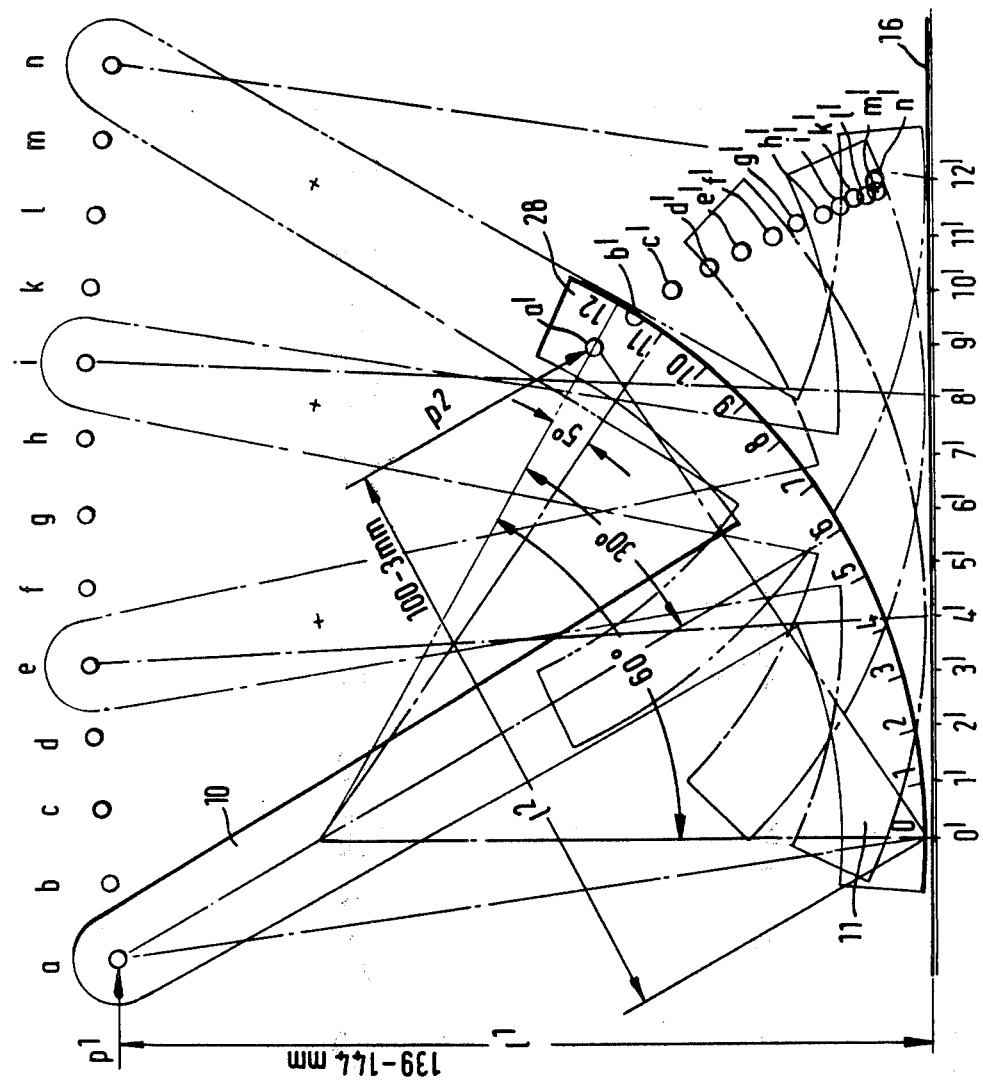
FIG. 3 is a plan view of an embodiment of an actuating lever similar to that shown in FIG. 1.

The lever arrangement shown in FIGS. 1 and 2 is provided with an anchor-shaped actuating lever 10. The arrangement, which is drawn substantially to the correct scale, is concerned, for example, with a lever mechanism for operating the heating system in a motor vehicle. The actuating lever 10, has a lower part 11 in the form of a segment of a circle, and an upper part 12 to whose top end 13 the driving force, imparted to the actuating lever 10 from outside, is applied. In the case of a heating system this force is applied by hand. The centre of curvature of the segment 11 of the lever 10 is designated by the point 14.

The segment 11 of the actuating lever 10 is provided at its under-side with a toothed formation indicated by the dash-dot line 15 in FIG. 1. The actuating lever 10 engages by the toothed formation 15 in a corresponding toothed formation 16 which is machined in a stationary rack-like part 17. Under the appropriate application of force to the lever end 13, the two toothed formations 15, 16 roll over each other whilst the lever end 13 describes a relatively flat arc, which is identified by a dash-dot line 18 in FIG. 1. The radius of arc 18 is designated in FIG. 1 by BTR (="Betatigungsradius", i.e.

actuating radius). It will be apparent that the actuating radius becomes very great, with respect to the leverage conditions illustrated.

In order to ensure that, during the described rolling action of the actuating lever 10 over the rack 17, lifting of the actuating lever 10 relative to the rack 17 is prevented, lever 10 is provided at the centre of curvature 14 with a pin 19 which is surmounted by a guide rail 20. During the above-mentioned rocking movement of lever 10, the pin 19 travels along the guide rail 20 in a straight line (identified by an arrow 21 in FIG. 1), from a starting position $a^2$, through a middle position $b^2$, into an end position $c^2$.

With the above-described course of movement of the actuating lever 10 as shown in FIG. 1, the interengaging toothed formations 15, 16 are not absolutely necessary. Indeed, an appropriate rolling action of the segmental part 11 of the lever 10 over a flat foundation 17 is possible without such toothed portions. In this case, any slipping of the actuating lever can be prevented by the provision of suitable end supports on the segment 11 (not shown).

The force (e.g. manual effort) exerted on the actuating lever 10 at the top end 13 thereof is appropriately transmitted through a wire cable, such as a Bowden cable from the actuating lever 10 to the machine part to be operated, e.g. the air flap in a motor vehicle heating system. The Bowden cable may engage the actuating lever 10 at the point 22, for example. Then, during the rocking movement of the actuating lever 10, the point 22 describes a slightly curved path, indicated by arrow 23 in FIG. 1, whilst travelling from the initial position $a^6$, through a mid-position $b^6$, into an end position $c^6$.

In each phase of the rolling movement, the tilting point of the actuating lever 10, which is of significance for the transmission of force, always lies at the place where the segment 11 engages by the toothed formation 15 in the toothed formation 16 of rack 17. No matter in what position the end 13 of the actuating lever 10 is located relative to rack 17, this place of contact is always situated at a point on the rack 17 defined by a line which, passing from the centre of curvature 14 of segment 11 and of the guide pin 19, intersects the toothed rack 16, 17 at right angles thereto. During its movement, the actuating lever 10 tilts about this moving point. The result is that the effective lever length wHL (wirksame Hebellange) remains almost unchanged. When the force applied to the actuating lever 10 is passed on via the point of application 22 (via a Bowden cable, for example), this transmission takes place with only a slight change in the force transmission ratio throughout the movement of lever 10, because the points 13 and 22 describe oppositely directed arcs 18 and 23 respectively. The ratio between the force (P 1) delivered to the actuating lever at 13 and the load (P 2) applied at point 22, thus only varies gradually during the course of movement, as to its order of magnitude, the force transmission ratio is approximately 1:2.

According to another preferred embodiment of the invention (likewise illustrated by FIG. 1), the application point for the load (e.g. transmitted via Bowden cable) is provided as a point 24 which lies at one end of the segment 11 and in proximity to the curved toothed formation 15. As indicated by an arrow 25 in FIG. 1, the point 24 describes a slightly curved arc during the rocking movement of the actuating lever 10, whilst passing from an initial position $a^4$, via a mid-position $b^4$, into an end position $c^4$. In this case, an intense change in the force transmission ratio takes place during the course of the movement. With the lever conditions indicated in FIG. 1, the force ratio $P_1$ to $P_2$ changes from about 1:10 initially (at position $a^4$), through about 1:5 (at position $b^4$), to about 1:2 (at position $c^4$). Here, the travel of point 24 along path 25 corresponds in length approximately to the travel of point 22 along path 23.

Of course, it is possible—and also leads to a result corresponding to what has been described above—to select point 26 at the opposite end of segment 11, as the point of application for the load (e.g. via a Bowden cable). During the rocking movement of the actuating lever 10, this point then correspondingly describes a path from $a^5$, through $b^5$, to $c^5$.

The essential advantage of choosing the load application point at point 24 or 26 on the actuating lever 10 resides in the fact that whilst applying a constant force at the lever end 13, it is possible to commence or terminate switching or regulating actions with a transmission force ratio of about 1:10 whilst, on the other hand, in the middle range of the operating path, the transmission force ratio only amounts to about 1:2.

Departing from the embodiment according to FIGS. 1 and 2, the toothed rack 17 may in fact also be made curved in the same sense as the toothed segment 11 of the actuating lever 10. In this way it can be ensured that, during the rocking movement of the actuating lever 10, the upper lever end 13 no longer describes an arc 18 but, on the contrary, a straight line. In this case, the centre of curvature 14 and the guide pin 19 would describe a slight arc so that the guide rail 20 would have to be made correspondingly arched.

The same object, namely a rectilinear course of movement for the lever end 13 during a rocking movement of the actuating lever 10, can be attained even with a flat-shaped rack 17 provided that a curvature departing from the circular form is adopted for the toothed segment 11; indeed, this segment must have a flatter curve than that illustrated in FIG. 1. Naturally, both the rack 17 as well as segment 11 may be made curved so as to attain a rectilinear course for the lever end 13.

FIG. 3 graphically illustrates the movement and force conditions for an actuating lever similar to that shown in FIG. 1. Therefore, the actuating lever is again designated by 10 in FIG. 3. The two end positions of the actuating lever 10 according to FIG. 3 are designated by the letters a and n. Between these two end positions, the remaining 11 intermediate positions are inserted and bear the reference letters b-m. The driving force (e.g. manual effort) exerted on the actuating lever 10 at its end is designated by $P^1$. The load $P^2$ will however be engaged at the right-hand end 28 of the operating arm 10. The transmission ratio of the actuating lever 10 can then be expressed by the equation $$P^1 \times l^1 = P^2 \times l^2$$

For the initial position of the actuating lever 10 illustrated in the drawing of FIG. 3, the effective lever arm length $l^1 = 139$ mm, whereas the effective lever arm length $l^2 = 100$ mm. Here the point of contact between segment 11 and the rolling surface 16 lies at 0 and 0' respectively. With progressive rocking movement of the actuating lever 10, the place of contact travels over points 1, 2, 3 etc. up to point 12. The particular engagement point of the load $P^2$ is designated respectively by the letters a', b', c' etc. up to n'. The leverages with respect to $l^1$ and $l^2$, graphically determined according to FIG. 3, are summarized in the following table.

| LEVER | | Fulcrum | $P^1$ kp | × × | $l^1$ mm | = = | $l^2$ mm | × × | $P^2$ kp |
|---|---|---|---|---|---|---|---|---|---|
| a | 0 | a' | 0—0' | 1.0 | 139 | | 100 | | 1.4 |
| b | 1 | b' | 1—1' | 1.0 | 141 | | 93 | | 1.5 |
| c | 2 | c' | 2—2' | 1.0 | 142 | | 85 | | 1.6 |
| d | 3 | d' | 3—3' | 1.0 | 143 | | 77 | | 1.8 |
| e | 4 | e' | 4—4' | 1.0 | 143 | | 69 | | 2.0 |
| f | 5 | f' | 5—5' | 1.0 | 144 | | 61 | | 2.3 |
| g | 6 | g' | 6—6' | 1.0 | 144 | | 52 | | 2.8 |
| h | 7 | h' | 7—7' | 1.0 | 144 | | 43 | | 3.4 |
| i | 8 | i' | 8—8' | 1.0 | 143 | | 32 | | 4.4 |
| k | 9 | k' | 9—9' | 1.0 | 143 | | 27 | | 5.3 |
| l | 10 | l' | 10—10' | 1.0 | 142 | | 19 | | 7.5 |
| m | 11 | m' | 11—11' | 1.0 | 141 | | 10 | | 14.0 |
| n | 12 | n' | 12—12' | 1.0 | 139 | | 3 | | 46.3 |

From the table, it will be apparent that the effective lever arm length $l^1$ of the external force $P^1$ only varies between a minimum value of 139 mm and a maximum value of 144 mm, i.e. it remains substantially constant in length whereas the effective lever arm length $l^2$ for the load diminishes from a maximum value of initially 100 mm to a minimum value of 3 mm. Now if we assume that the force $P^1$ will amount to 1 kp, then for the force $P^2$ (as will also be seen from the above table) we get values between 1.4 kp at the commencement of the rocking movement of the actuating lever 10, and 46.3 at the end of the rocking movement of lever 10. Thus, in the course of this rocking movement of lever 10, the force transmission ratio effectively transmitted by the lever 10 varies from 1:1.4 initially, to 1:46.3 finally.

The intense variation of force $P^2$, whilst $P^1$ remains constant, is illustrated graphically by a graph shown in FIG. 4 which is based on the values set out in the above table.

By using a lever assembly according to the invention for actuating an adjustable member it is possible to arrange that during the operating movement of the lever, the relation between the externally applied driving force and the effective force applied to the adjustable member continuously changes, i.e. during the course of the lever movement, a steady variation of the force transmission ratio takes place. In the specific case for which the invention is conceived in the first place, i.e. for operating the heating system of a motor vehicle, this is particularly important because, as a rule, it is very difficult to set the desired inside temperature of the passenger space exactly. Moreover, the air flaps of a manually operated system which are opened and closed by the lever mechanism, frequently offer a highly differing resistance to movement in the various lever positions.

Nevertheless, the invention is by no means limited solely to heating systems in motor vehicles; on the contrary, completely different fields of application for which the invention could be employed, are conceivable.

What is claimed is as follows:

1. An actuating lever assembly for the actuation of an adjustable member in a mechanical assembly, said actuating lever assembly comprising: a support frame including a support surface and a guide means having oppositely facing sides arranged substantially parallel to, and spaced apart from, said support surface, one of said sides facing toward said support surface and the other side facing away therefrom; a movable actuating lever extending across said sides of said guide means and supported in said frame, one end of said actuating lever having a symmetrically curved shape with a center of curvature located between said guide means and said support surface, said centre of curvature being located adjacent said one side of said guide means and said curved end of said actuating lever being engageable with said support surface in such a manner that said actuating lever is both supported by, and can roll relative to, said support surface, between predetermined limits while maintaining the other end of said actuating lever at a substantially constant distance from said other side of said guide means, on the application of a transverse force to said other end of said lever; guide means fixed on said lever adjacent the centre of curvature of said curved end and slidably engageable with said one side of said guide means on said support frame to maintain engagement of said curved end of the lever and said support surface; and a connection point on said lever for the attachment thereto of a mechanical linkage between said adjustable member and said lever, which connection point is situated on said lever between said lever guide means and said curved end of the lever so that the ratio of the force applied to the other end of the lever to the force applied at the connection point varies continually above a predetermined force multiplication value as the lever is moved between said predetermined limits.

2. An actuating lever assembly for the actuation of an adjustable member in a heating and ventilating assembly in a motor vehicle, said actuating lever assembly comprising: a support frame including a support surface and a guide means having oppositely facing sides arranged substantially parallel to, and spaced apart from, said support surface, one of said sides facing toward said support surface and the other side facing away therefrom; a movable anchor-shaped actuating lever extending across said sides of said guide means and supported in said frame, one end of said actuating lever having a symmetrically curved end surface with a centre of curvature located between said guide means and said support surface, said centre of curvature being located adjacent said one side of said guide means and said curved end of said actuating lever being engageable with said support surface in such a manner that said actuating lever is both supported by, and can roll relative to, said support surface, between predetermined limits while maintaining the other end of said actuating lever at a substantially constant distance from said other side of said guide means, on the application of a transverse force to said other end of said lever; guide means fixed on said lever adjacent the centre of curvature of said curved end and slidably engageable with said one side of said guide means on said support frame to maintain engagement of said curved end surface of the lever and said support surface; and a connection point on said lever for the attachment thereto of a mechanical linkage between said adjustable member and said lever, which connection point is situated on said lever adjacent a terminal portion of said curved end surface of the lever so that the ratio of the force applied to the other end of the lever to the force applied at the connection point is at a predetermined force multiplication value when the lever is at one of said predetermined limits and increases continually as the lever is moved towards the other of said predetermined limits.

3. An actuating lever assembly for the actuation of an adjustable member in a heating and ventilating assembly in a motor vehicle, said actuating lever assembly comprising: a support frame including a flat support surface and a guide means having oppositely facing sides arranged substantially parallel to, and spaced apart from, said flat support surface, one of said sides facing toward said support surface and the other side facing away therefrom; a movable anchor-shaped actuating lever extending across said sides of said guide means and supported in said frame, one end of said actuating lever having a symmetrically curved end surface with a centre of curvature located between said guide means and said support surface, said centre of curvature being located adjacent said one side of said guide means and said curved end of said actuating lever being engageable with said flat support surface in such a manner that said actuating lever is both supported by, and can roll relative to, said flat support surface, between predetermined limits while maintaining the other end of said actuating lever at a substantially constant distance from said other side of said guide means, on the application of a transverse force to said other end of said lever; guide means fixed on said lever adjacent the centre of curvature of said curved end and slidably engageable with said one side of said guide means on said support frame to maintain engagement of said curved end of the lever and said flat support surface; and a connection point on said lever for the attachment thereto of a mechanical linkage between said adjustable member and said lever, which connection point is situated on said lever adjacent a terminal portion of said curved end surface of the lever so that the ratio of the force applied to the other end of the lever to the force applied at the connection point is at a predetermined force multiplication value when the lever is at one of said predetermined limits and increases continuously to a predetermined substantially higher value as the lever is moved to the other of said predetermined limits.

4. An actuating lever assembly for the actuation of an adjustable member in a heating and ventilating assembly in a motor vehicle, said actuating lever assembly comprising: a support frame including a flat, toothed support surface and a guide means having oppositely facing sides arranged substantially parallel to, and spaced apart from, said toothed support surface, one of said sides facing toward said support surface and the other side facing away therefrom; a movable anchor-shaped actuating lever extending across said sides of said guide means and supported in said frame, one end of said actuating lever having a symmetrically curved end surface with a centre of curvature located between said guide means and said support surface, said center of curvature being located adjacent said one side of said guide means and said curved end of said actuating lever having a toothed configuration engageable with said toothed support surface in such a manner that said actuating lever is both supported by, and can roll relative to, said toothed support surface, between predetermined limits while maintaining the other end of said actuating lever at a substantially constant distance from the other side of said guide means, on the application of a transverse force to said other, free, end of said lever; guide means fixed on said lever adjacent the centre of curvature of said curved end and slidably engageable with said one side of said guide means on said support frame to maintain tooth engagement of said lever and said support surface; and a connection point on said lever for the attachment thereto of a mechanical linkage between said adjustable member and said lever, which connection point is situated on said lever adjacent a terminal portion of said curved end surface of the lever so that the ratio of the force applied to the other end of the lever to the force applied at the connection point is at a predetermined low force multiplication value when the lever is at one of said predetermined limits and increases continuously to a predetermined high value as the lever is moved to the other of said predetermined limits.

5. An actuating lever assembly for the actuation of an adjustable member in a heating and ventilating assembly in a motor vehicle, said actuating lever assembly comprising: a support frame including a curved, toothed support surface and a guide means having oppositely facing sides arranged substantially parallel to, and spaced apart from, said toothed support surface, one of said sides facing toward said support surface and the other side facing away therefrom; a movable anchor-shaped actuating lever extending across said sides of said guide means and supported in said frame, one end of said actuating lever having a symmetrically curved end surface with a centre of curvature located between said guide means and said support surface, said centre of curvature being located adjacent said one side of said guide means and said curved end of said actuating lever having a toothed configuration engageable with said toothed support surface in such a manner that said actuating lever is both supported by, and can roll relative to, said toothed support surface, between predetermined limits while maintaining the other end of said actuating lever at a substantially constant distance from said other side of said guide means, on the application of a transverse force to said other, free, end of said lever; guide means fixed on said lever adjacent the centre of curvature of said curved end surface and slidably engageable with said one side of said guide means on said support frame to maintain toothed engagement of said lever and said support surface; and a connection point on said lever for the attachment thereto of a mechanical linkage between said adjustable member and said lever, which connection point is situated on said lever adjacent a terminal portion of said curved end surface of the lever so that the ratio of the force applied to the other end of the lever to the force applied at the connection point is at a predetermined low force multiplication value when the lever is at said one predetermined limit and increases continuously to a predetermined high value as the lever is moved to said other predetermined limit.

6. An actuating lever assembly for the actuation of an adjustable member in a heating and ventilating assembly in a motor vehicle, said actuating lever assembly comprising: a support frame including a flat, toothed, support surface and a guide means having oppositely facing sides arranged substantially parallel to, and spaced apart from, said toothed support surface; a movable anchor-shaped actuating lever extending across said sides on said guide means and supported in said frame, one end of said actuating lever having a symmetrically curved end surface with a centre of curvature located between said guide means and said support surface, said centre of curvature being located adjacent said one side of said guide means and said curved end of said actuating lever having a toothed configuration engageable with said toothed support surface in such a manner that said actuating lever is both supported by, and can roll relative to, said toothed support surface, between predetermined limits while maintaining the other end of said actuating lever at a substantially constant distance from said other side of said guide means, on the application of a transverse force to the other, free, end of said lever, guide means fixed on said lever adjacent the centre of curvature of said curved end surface and slidably engageable with said one side of said guide means on said support frame to maintain tooth engagement of said lever and said support surface; and a connection point on said lever for the attachment thereto of a mechanical linkage between said adjustable member and said lever, which connection point is situated on said lever adjacent a terminal portion of said curved end surface of the lever so that the ratio of the force applied to the other end of the lever to the force applied at the connection point is at a predetermined low force multiplication value when the lever is at said one predetermined limit and increases continuously to a predetermined high value as the lever is moved to said other predetermined limit.

* * * * *